United States Patent
Kim

[11] Patent Number: 5,829,825
[45] Date of Patent: Nov. 3, 1998

[54] ROOF DRIP CONSTRUCTION OF AN AUTOMOBILE

[75] Inventor: Kyung Sin Kim, Kyungkido, Rep. of Korea

[73] Assignee: Hyundai Motor Company, Seoul, Rep. of Korea

[21] Appl. No.: 725,919

[22] Filed: Oct. 4, 1996

[30] Foreign Application Priority Data

Oct. 6, 1995 [KR] Rep. of Korea .................. 95-34309

[51] Int. Cl.⁶ .................................................. B60D 25/06
[52] U.S. Cl. ........................................... 296/210; 296/213
[58] Field of Search ............................ 396/213, 210; 52/17, 45

[56] References Cited

U.S. PATENT DOCUMENTS

| | | | |
|---|---|---|---|
| 4,792,180 | 12/1988 | Jacobsen et al. | 296/210 |
| 5,013,083 | 5/1991 | Yada et al. | 296/213 |
| 5,074,610 | 12/1991 | Tamura et al. | 296/93 |
| 5,413,398 | 5/1995 | Kim | 296/210 |

FOREIGN PATENT DOCUMENTS 6-29154  8/1994  Japan .

*Primary Examiner*—D. Glenn Dayoan
*Assistant Examiner*—Clovia Hamilton
*Attorney, Agent, or Firm*—Finnegan, Henderson, Farabow, Garrett & Dunner, L.L.P.

[57] ABSTRACT

A roof drip construction for an automobile which includes a roof panel and a side outer panel welded to each other forming a rain passage whose lower width is larger than its upper width. A mould having a plurality of wings is fitted in the rain passage while the wings are in close contact with the inside walls of the roof panel and the side outer panel defining the rain passage. Stud pins mounted on the roof panel are fitted in the mould so as to prevent the mould from being removed out of the rain passage. A rain gutter is formed at the side outer paenl to prevent raindrops in the rain passage from flowing downward along the side door of the automobile.

15 Claims, 2 Drawing Sheets

ROOF DRIP CONSTRUCTION OF AN AUTOMOBILE

BACKGROUND OF THE INVENTION

1. Field of the Invention

The present invention relates to a roof drip construction of an automobile, and more particularly to a roof drip construction of an automobile, in which a roof panel and a side outer panel welded to each other have improved shapes so as to form a rain passage having an improved shape, and a mould having a plurality of wings is fitted in the rain passage while the wings are in close contact with the roof panel and the side outer panel.

2. Description of the Prior Art

In general, an automobile employs a roof panel and a mould assembled with the roof panel for preventing raindrops from being fallen directly onto the door side of the automobile from above and guiding the raindrops along the roof panel.

FIGS. 1 and 2 show a conventional assembled construction of the roof panel and the mould. As shown, a roof panel 10 has an L-shaped bent portion 10a disposed at one end thereof and a flange 11 protruding vertically upward from and formed integrally with the bent portion 10a. The side outer panel 12 and the bent portion 10a welded to each other define a rain passage therebetween.

Further, a clip 14 is fitted to the flange 11 protruding from the bent portion 10a, and a mould 15 is fixedly engaged with engaging jaws 14a formed at the opposite sides of the clip 14. The mould 15 fixedly engaged with the engaging jaws 14a prevents a water leakage even when there is an imperfectly welded portion.

In case where the clip 14 is fitted in the direction of width of the automobile in the rain passage 13 defined by the roof panel 10 and the outer panel 12 welded to each other and the mould 15 is fixedly engaged with the engaging jaws 14a of the clip 14 as described above, the side outer panel 12 is positioned slightly higher than the roof panel 10. Therefore, the raindrops in the rain passage 13 are prevented from flowing downward along the side door past the side outer panel 12. Further, the mould 15 prevents a water leakage even when there is an imperfectly welded portion.

Japanese utility model publication No. P6-29154 discloses a roof side construction of an automobile. In the roof side construction, a trench extending in the longitudinal direction of the automobile is formed in the roof side of the automobile in such a manner that an outside standing wall is lower than an inside standing wall. A plurality of first standing flanges and a plurality of second standing flanges are respectively formed at the outside standing wall of the trench. The first standing flanges are snap-fitted with a strip-shaped roof mould member covering over the trench. The plurality of second standing flanges are snap-fitted with a roof leg member. Each of the first standing flanges is disposed near each of the second standing flanges with it being formed with regular intervals at the outside standing wall and the width of each first standing flange is narrower than that of each second standing flange.

However, the disadvantange that since the upper width of the roof panel is wider than the lower width of the roof panel jointed with the side outer panel by melting, the size of the mould should also be increased causing the thickness of the mould to extend all over the roof panel, thereby to degrade the aesthetic effect of the appearance and to increase the number of manufacturing steps and manufacturing expense due to the clip used in fixing the mould is invited. There is a further disadvantage that a gap having a size corresponding to that of the welding gun is required in the above construction.

Furthermore, in the above described conventional roof side construction, the first and the second standing flanges are formed at the outside standing wall, and a separate assembling member is required to assemble the roof leg member and the side roof portion with each other. Therefore, the number of the parts of the construction is increased and the manufacturing process is complicated. Further, the productivity in mass-production of the roof side constructions is deteriorated.

SUMMARY OF THE INVENTION

The present invention has been made to overcome the above described problems of the prior arts, and accordingly it is an object of the present invention to provide a roof drip construction of an automobile, which has an improved aesthetic appearance and can be easily and simply assembled, and which does not require a separate part for fixing a mould, thereby reducing the manufacturing cost thereof.

To achieve the above object, the present invention provides a roof drip construction of an automobile comprising:

- a roof panel and a side outer panel disposed at an upper edge of a side door of an automobile, and welded to each other to form together a rain passage between the roof panel and the side panel;
- a mould fitted in the rain passage, for preventing a water leakage when there is an imperfectly welded portion;
- a plurality of stud pins mounted on the roof panel, the stud pins being fitted in the mould so as to prevent the mould from getting removed out of the rain passage; and
- a rain gutter formed at an upper portion of the side outer panel by bending the upper portion of the side outer panel, for preventing raindrops in the rain passage from flowing downward along the side door of an automobile past the side outer panel.

BRIEF DESCRIPTION OF THE DRAWINGS

The above object, and other features and advantages of the present invention will become more apparent by describing in detail preferred embodiments thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
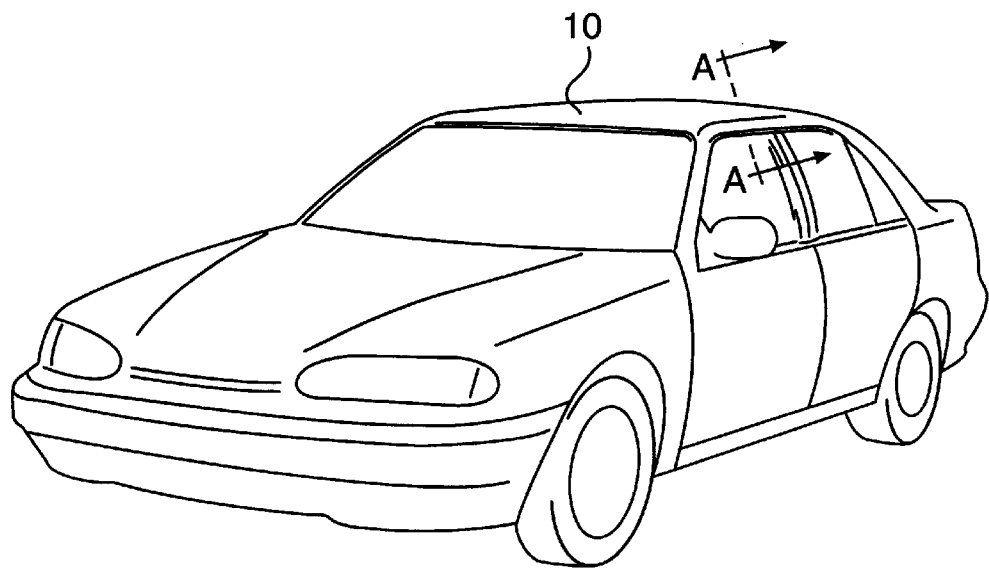
FIG. 1 is a perspective view of a general automobile.
Figure 2:
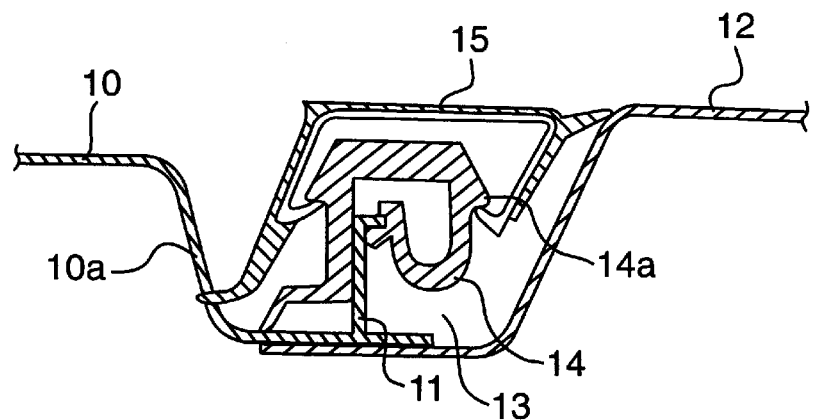
FIG. 2 is a sectional view taken along line A—A in FIG. 1, which shows the conventional roof drip construction of a roof panel employed in the automobile in FIG. 1.
Figure 3:
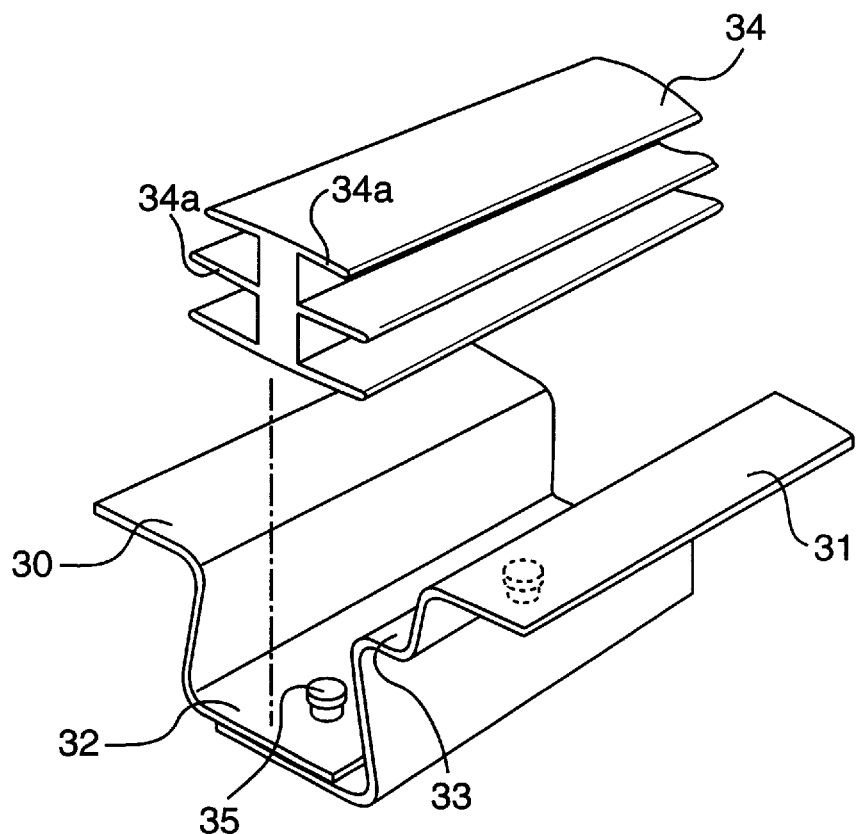
FIG. 3 is an exploded perspective view of a roof drip construction of a roof panel according to the present invention.
Figure 4:
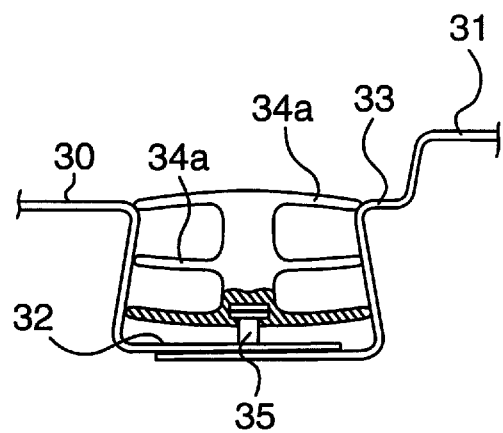
FIG. 4 is a sectional view of the roof drip construction shown in FIG. 3.

Referring to FIG. 3 for showing a roof drip construction of a roof panel of an automobile according to the present invention, a side outer panel 31 is welded to a lower surface of a roof panel 30, so as to form a rain passage 32 between the roof panel and the side outer panel. The width of the upper portion of the rain passage 32 is narrower than that of the lower portion of the rain passage 32. The upper portion of the side outer panel 31 is bent on a level identical with the upper level of the roof panel so as to have a rain gutter 33 formed integrally with the side outer panel 31. The rain gutter 33 prevents the raindrops in the rain passage 32 from flowing downward along the side door of an automobile past the side outer panel 31.

In the meantime, a mould 34 is fitted from the space above the roof panel 30 into the rain passage 32. The mould 34 prevents a water leakage when there is an imperfectly welded portion. The mould 34 is provided with a plurality of wings 34a formed integrally with the central portion of the mould 34. The wings 34a come into close contact with inside walls of the side outer panel 31 and the roof panel 30 defining the rain passage 32 together, when the mould 34 is fitted by pushing it into the rain passage 32. A plurality of stud pins 35 are mounted on the roof panel 30 in such a manner that they are spaced regular intervals apart. The stud pins 35 prevent the mould 34 from getting removed out of the rain passage 32.

In assembling the roof drip construction as constructed above, the mould 34 is firstly fitted by pushing it into the rain passage 32 whose the lower width is larger than the upper width thereof. While the mould 34 is inserted into the rain passage 32, the opposite ends of the wings 34a are guided along inside walls of the roof panel 30 and the side outer panel 31 defining the rain passage with them being in close contact with the inside walls. In this case, when the mold 34 is being inserted into the rain passage 32, the wings of the mould are deformed slightly.

Just when the mould 34 is completely inserted in the rain passage 32, the lower wing of the mould 34 is restored to its initial position. Then, the stud pins 35 disposed on the roof panel 30 are fitted in the lower center portion of the mould 34, so as to prevent the mould 34 from getting removed out of the rain passage 32.

After the roof drip construction according to the present invention is assembled as described above, the raindrops flowing along the roof panel 30 are guided along the rain gutter 33 arranged at one side of the outer panel 31, so that they are prevented from flowing downward along the side door of the automobile past the side outer panel 31.

According to the roof drip construction of the present invention as described above, the rain passage can be so formed by the roof panel and the side outer panel that the upper width or gap between the roof panel and the side outer panel welded to each other is narrower than the lower width therebetween. Therefore, the mould to be inserted into the rain passage can be miniaturized, and thereby the aesthetic effect of appearance of the roof drip construction may be improved.

Further, since the mould can be simply fitted in the rain passage by pushing it, the manufacturing process may be simplified and eased. Furthermore, separate parts such as a clip for fixing the mould or a roof leg member are not required in the roof drip construction. Therefore, the manufacturing cost can be remarkably reduced, and the yield in mass-production is highly improved due to the simplified construction.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A roof drip construction for an automobile having a roof panel with a side edge and a side outer panel with an upper edge, the roof drip construction comprising:

an elongated channel extending substantially parallel to the side edge of the roof panel and having first and second upwardly positioned sides joined by a substantially horizontal base, said first side extending to engage the side edge of the roof panel, said second side extending to engage said upper edge of the side outer panel, wherein said second side extends to a height greater than said first side.

2. The roof drip construction recited in claim 1, wherein:

said second side includes a first upwardly positioned section and a second upwardly positioned section joined to the first section by a substantially horizontal surface, the second section extending upward beyond the height of the first side.

3. The roof drip construction recited in claim 2, wherein:

said first section extends upward to a height substantially equal to the height of the first side.

4. The roof drip construction recited in claim 3, further comprising:

a molding fitted in the channel to substantially prevent water from reaching the base; and a plurality of studs fixed to the base, the plurality of studs being disposed along the base and projecting upwardly from the base to engage the molding and substantially prevent the removal of the molding from the channel.

5. A roof drip construction for an automobile comprising:

a roof panel having a side edge;

a side outer panel having an upper edge;

an elongated channel extending substantially parallel to the side edge of said roof panel and having first and second upwardly positioned sides joined by a substantially horizontal base, said first side extending to engage the side edge of said roof panel, said second side extending to engage the upper edge of-said-side outer panel, wherein said second side extends to a height greater than said first side.

6. The roof drip construction recited in claim 5, wherein:

said base comprises first and second overlapping panels.

7. The roof drip construction recited in claim 6, wherein:

said roof panel, said first side and said first overlapping panel are a first single unitary member, and said side outer panel, said second side and said second overlapping panel are a second single unitary member.

8. The roof drip construction recited in claim 5, wherein:

said roof panel, said first side, said base, said second side and said side outer panel are a single unitary member.

9. The roof drip construction recited in claim 7, wherein:

said second side includes a first upwardly positioned section and a second upwardly positioned section joined to the first section by a substantially horizontal surface, the second section extending upward beyond the height of the first side.

10. The roof drip construction recited in claim 9, wherein:

said first section extends upward to a height substantially equal to the height of the first side.

11. The roof drip construction recited in claim 6, further comprising:

a molding fitted in the channel to substantially prevent water from reaching the first and second overlapping panels; and a plurality of studs fixed to the base, the plurality of studs being disposed along the base and projecting upwardly from the base to engage the molding and substantially prevent the removal of the molding from the channel.

12. The roof drip construction recited in claim 11, wherein:

the molding comprises a plurality of wings formed integrally with a central portion of the molding, the plurality of wings extending substantially perpendicular to the central portion and contacting the first and second sides of the channel when the molding is fitted in the channel.

13. The roof drip construction recited in claim 11, wherein:

each of the plurality of studs are spaced a substantially equal distance apart along the base.

14. The roof drip construction recited in claim 5, wherein the channel has an upper width and a lower width larger than the upper width.

15. The roof drip construction recited in claim 6, wherein the first and second overlapping panels are welded.

* * * * *